No. 675,721. Patented June 4, 1901.
J. H. DENISON.
CULTIVATOR.
(Application filed Jan. 26, 1901.)
(No Model.) 2 Sheets—Sheet 1.
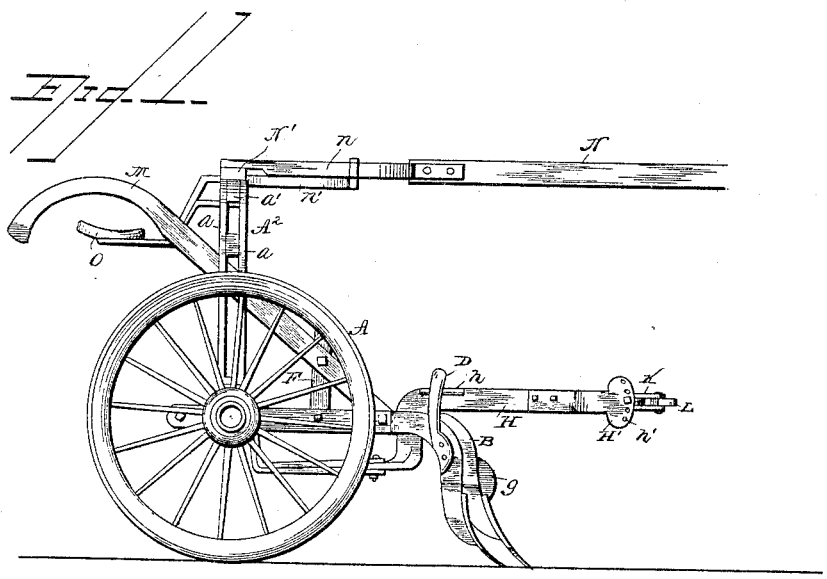
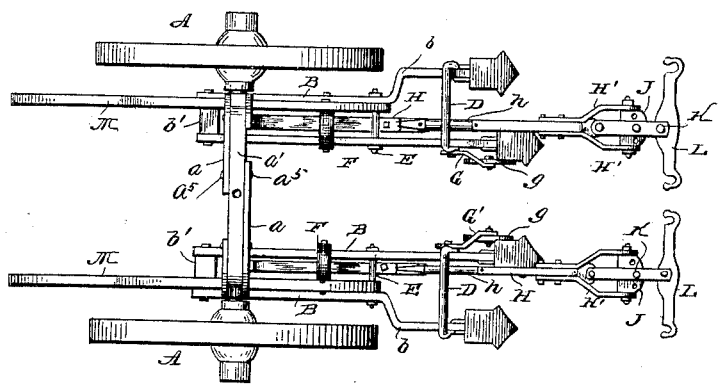

No. 675,721. Patented June 4, 1901.
J. H. DENISON.
CULTIVATOR.
(Application filed Jan. 26, 1901.)
(No Model.) 2 Sheets—Sheet 2.
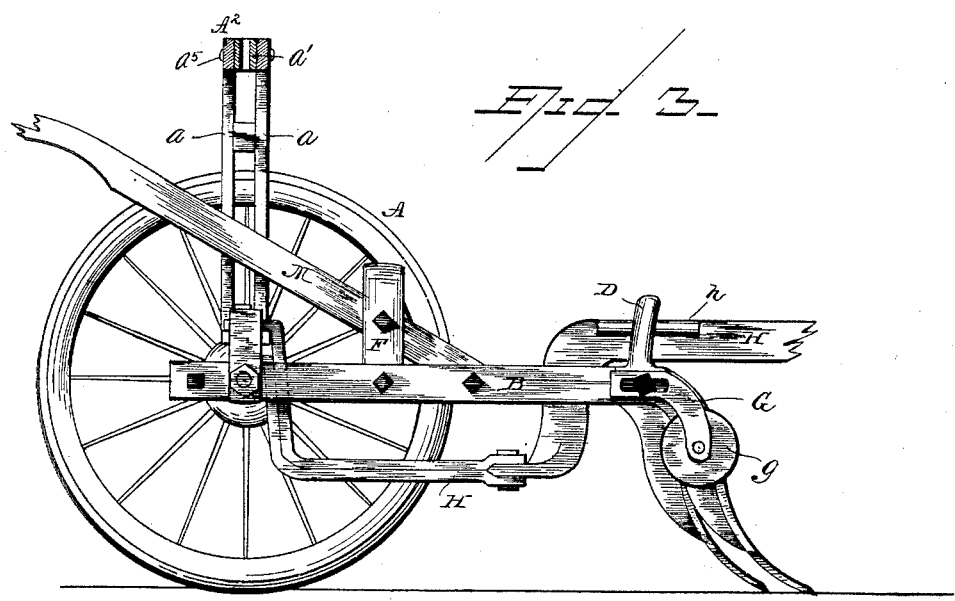
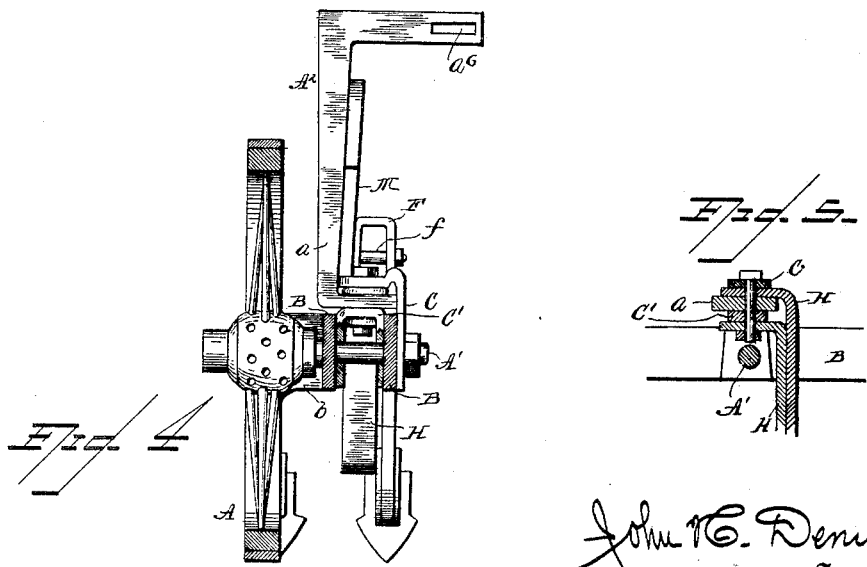

UNITED STATES PATENT OFFICE.

JOHN HUSTON DENISON, OF MAQUON, ILLINOIS.

CULTIVATOR.

SPECIFICATION forming part of Letters Patent No. 675,721, dated June 4, 1901.

Application filed January 26, 1901. Serial No. 44,848. (No model.)

*To all whom it may concern:*

Be it known that I, JOHN HUSTON DENISON, a citizen of the United States, and a resident of Maquon, in the county of Knox and State of Illinois, have invented a Cultivator, of which the following is a specification.

The object of this invention is to provide a wheel-cultivator which is especially adapted for the purpose of cultivating corn and in which the plows or shovels are arranged in pairs, so as to operate between the rows, the beams supporting said plows or shovels projecting forwardly from the axle and connected thereto in such manner that they can be tilted to enter the soil to a more or less extent and also swung upward above the ground for convenience in transportation and for the purpose of clearing an obstruction.

The invention contemplates a peculiar construction and arrangement of parts by which to provide a cultivator that shall be light in construction, consistently with the required strength, which can be easily and conveniently operated in use, and in which the plows or shovels are located in front, so that the action of the same can be watched by the person riding or walking in the rear of the machine.

With the above objects in view the invention consists of a cultivator comprising the ground-wheels connected by an arched frame, shovel-beams arranged in pairs and pivoted to the axles, from which they project forwardly, yoke-frames connecting the beams of each pair to each other, draft-bars bolted to the axles and provided with friction-rollers upon which the plow-beams ride, and operating-handles connected to the plow-beams.

The invention further consists in the particular construction and combination of parts constituting my improved cultivator.

In the following specification I have entered into a detail description of my invention, reference being had to the accompanying drawings, and to letters of reference thereon, which designate the different parts, and what I claim is more specifically set forth in the appended claims.

In the drawings, Figure 1 is a side elevation of a cultivator constructed in accordance with my invention. Fig. 2 is a plan view. Fig. 3 is a vertical longitudinal sectional view through the center of the machine. Fig. 4 is a rear end view, partly in section. Fig. 5 is a sectional view through one of the short axles and parts supported thereon.

Referring to said drawings, A A designate the supporting-wheels of the cultivator, which are mounted upon short axles A' A', connected by an arched frame A², the said frame consisting of flat bars $a\ a$, bent at their upper ends and laterally adjustably connected to a horizontal beam or bar $a'$ by means of bolts $a^5$, passed through slots $a^6$ in the flat bars and through holes in said beam, in order that the width of the machine or space between the pairs of cultivators may be increased and diminished. Pivotally connected to the short axles A' and projecting forwardly therefrom are plow-beams B, arranged in pairs or two upon each axle, the forward ends of said plow-beams being curved downward, as shown, to form the standards for the plows or shovels, which are rigidly secured thereto. Each pair of plow-beams are connected near their forward ends by a yoke D and are further braced by a cross-bar E and stirrup F intermediate of the yoke and axle, the stirrups having cross-bars $f$, which form foot-rests for the driver when the seat and tongue are attached. The inner cultivator-beam of each pair has secured to its outer end a depending arm or hanger G, which carries a colter-wheel $g$, located in the rear of the plow and serving as a shield to prevent the upturned soil from being thrown upon the young corn. The beams which carry the outer plows or shovels are bent laterally in front of the supporting-wheels, as shown at $b$, to locate said plows or shovels on a line with the supporting-wheels or beyond the same.

Connected to the lower ends of the arched frame and extending therefrom forwardly between the plow-beams are draft-bars H, the rear portion of said draft-bars being in two parts (see Fig. 5) and have a downwardly-bent portion or loop in front of the axle, as shown, so as to not interfere with the movement of the plow-beams. Each draft-bar is provided near its forward end with a roller $h$, disposed longitudinally of the machine, and upon these rollers rest the yokes D when the plows or shovels are in operation and reduce the friction between the parts when the beams are shifted to one side in dodging the corn, this operation being assisted by a small spring *i*, located under the draft-bar.

A clevis is provided at the forward end of each draft-bar, to which the draft-animals are hitched. Said clevis is formed by the diverging members H' H' at the forward end of the draft-bar provided with a vertical series of bolt-holes *h'*, and between these members is supported adjustably a plate J, to which the connecting-bail K is bolted, the said plate having a number of holes to permit of a lateral adjustment of said bail. A whiffletree L is connected to the end of the bail, as shown. It will be noted, therefore, that this clevis provides for both a vertical and lateral adjustment to regulate the depth of the plowing and the distance between the horses.

M M designate the handles by which the plow-beams are raised and lowered, the said handles being bolted to the forward part of the outer plow-beams and to the stirrups. The lifting of the shovels is facilitated by depressing the extended rear ends of the beams, the operator resting his feet upon the crosspieces *b'*.

In order that the machine may be used as a riding-cultivator, I provide the same with a tongue N, which is provided with hounds *n* at its rear end, connected by a cross-bar N', said cross-bar resting upon the upper part of the arched frame A² and is bolted thereto. A curved brace-bar *n'* is attached to the hounds and bears against the arched frame. The seat O, which projects rearwardly from the arched frame between the end portions of the handles, is connected to said arched frame by the bolt which connects the tongue.

From the foregoing description, in connection with the accompanying drawings, the construction and operation of my improved cultivator will be readily understood, and it will be noted that it can be operated by a person either walking behind the machine or riding upon the seat carried by the arched frame. The important feature of having the plow-beams project forwardly not only permits the action of the shovels or plows to be watched by the driver, but also insures a better operation of the plows or shovels, more especially in cross-plowing, in which case the plows maintain a uniform depth and have no tendency to jump the ridges. This arrangement is also of advantage in clearing obstructions, and in this connection it will be noted that each pair of plows may be operated independently.

When used as a riding-cultivator, the driver rests his feet in the stirrups F and assists in holding the shovels in the ground to the proper depth, and as the plows have an independent lateral movement for the purpose of dodging corn the said plows may be shifted by the handles, assisted by the driver's foot.

The arched frame is pivotally connected to the short axles, so that an uneven draft by the horses can be quickly noted. The wheels are made very strong to increase the durability of the machine, and to this end said wheels are cast, the spokes being arranged with an inner direct spoke and outside inclined spokes, while the hub is provided with a removable box that may be renewed when worn.

Having thus described my invention, I claim—

1. In a cultivator, the combination with the supporting-wheels and axles, of an arched frame connecting said axles, plow-beams arranged in pairs and connected to the axle from which they project forwardly, yokes or cross-bars connecting each pair of plow-beams, and draft-bars extending between the plow-beams and under the yokes, substantially as shown and described.

2. In a cultivator, the combination with the supporting-wheels and axles, of an arched frame pivotally connected to the axles, plow-beams arranged in pairs and mounted on the axles from which they project forwardly, yokes or cross-bars connecting each pair of plow-beams, and draft-bars connected to the axles and extending between the plow-beams under the yokes, substantially as shown and described.

3. In a cultivator, the combination, of the supporting-wheels and axles, a longitudinally-adjustable arched frame connecting the axles, plow-beams arranged in pairs and pivoted to the axles from which they project forwardly, draft-bars connected to the axles and extending between the plow-beams, and handles attached to said plow-beams, substantially as shown and described.

4. In a cultivator, the combination, of the supporting-wheels and short axles, a longitudinally-adjustable arched frame pivotally connected at its ends to the short axles, plow-beams arranged in pairs and pivoted upon the axles from which they project forwardly, and draft-bars extending between the plow-beams; together with handles attached to the plow-beams and projecting rearwardly therefrom, substantially as shown and described.

5. In a cultivator, the combination, of the supporting-wheels and short axles, an arched frame connecting the axles, plow-beams arranged in pairs and projecting forwardly from the axles, stirrups connected to the plow-beams, and a yoke connecting the forward ends of said beams; together with the draft-bars extending between the plow-beams, and a friction-roller mounted upon said draft-bars, substantially as shown and described.

6. In a cultivator, the combination, of the supporting-wheels and short axles, an arched frame connecting the axles, plow-beams arranged in pairs and projecting forwardly from the axle to which they are pivoted, yokes connecting the plow-beams, draft-bars projecting between the plow-beams and having friction-rollers upon which the yokes rest when the plow-beams are lowered, and handles attached to the plow-beams and projecting rearwardly therefrom; together with a tongue and seat connected to the upper part of the arched frame, substantially as shown and described.

7. In a cultivator, the combination, of the supporting-wheels and short axles, of an arched frame connecting said axles, plow-beams extending forwardly from the axles upon which they are pivoted, arms adjustably connected to the forward ends of the plow-beams, and wheels or rollers carried by said arms disposed alongside the inner pair of shovels; together with the draft-bars and operating-handles, substantially as shown and described.

8. In a cultivator, the combination, of the supporting-wheels, and short axles, an arched frame connecting said axles, plow-beams pivoted to the axles and extending forwardly therefrom, means for connecting the plow-beams of each pair to each other; together with the draft-bars having diverging members at their forward ends with a vertical row of bolt-holes, plates adjustably supported between said members, and a draft-bail adjustably connected to said plate, substantially as shown and described.

9. In a cultivator, the combination, of the supporting-wheels, short axles carried thereby and connected by an arched frame, plow-beams arranged in pairs and pivotally supported near their rear ends upon said axles, a cross-piece connecting the rear ends of each pair of beams and a stirrup connecting said beams in front of the axle; together with handles secured to the plow-beams, substantially as shown and for the purpose set forth.

10. In a cultivator, the combination of the supporting-wheels, short axles carried thereby and connected by an arched frame, plow-beams arranged in pairs and pivotally supported near their rear ends upon said axles, U-shaped supports C′ mounted upon said axle, a two-part draft-bar pivoted to said support to which the arched frame is also pivoted, and a binding-plate, substantially as shown and for the purpose set forth.

JOHN HUSTON DENISON.

Witnesses:
ETHEL B. SAUNDERS,
R. H. STEARNS.